(12) United States Patent
Spevacek et al.

(10) Patent No.: US 9,074,056 B2
(45) Date of Patent: Jul. 7, 2015

(54) METHODS AND SYSTEMS TO PREPARE FUNCTIONALIZED SUBSTRATE FROM DISULFIDE BOND-CONTAINING MATERIAL

(75) Inventors: John A. Spevacek, Woodbury, MN (US); Roger Pearson, Minneapolis, MN (US); Kenneth W. Richards, Plymouth, MN (US); Kenneth D. Zigrino, Eden Prairie, MN (US)

(73) Assignee: ASPEN RESEARCH CORPORATION, Maple Grove, MN (US)

( * ) Notice: Subject to any disclaimer, the term of this patent is extended or adjusted under 35 U.S.C. 154(b) by 0 days.

(21) Appl. No.: 14/342,182

(22) PCT Filed: Aug. 31, 2012

(86) PCT No.: PCT/US2012/053483
§ 371 (c)(1),
(2), (4) Date: Jun. 16, 2014

(87) PCT Pub. No.: WO2013/033614
PCT Pub. Date: Mar. 7, 2013

(65) Prior Publication Data
US 2014/0343188 A1 Nov. 20, 2014

Related U.S. Application Data

(60) Provisional application No. 61/530,016, filed on Sep. 1, 2011, provisional application No. 61/530,012, filed on Sep. 1, 2011.

(51) Int. Cl.
| | | |
|---|---|---|
| C08F 2/02 | (2006.01) | |
| C08J 7/16 | (2006.01) | |
| C08H 1/00 | (2006.01) | |
| C08F 273/00 | (2006.01) | |
| C08G 63/688 | (2006.01) | |
| C08J 7/18 | (2006.01) | |
| C08L 89/00 | (2006.01) | |
| C08F 220/06 | (2006.01) | |

(52) U.S. Cl.
CPC .. C08J 7/16 (2013.01); C08L 89/00 (2013.01); C08F 220/06 (2013.01); C08H 1/00 (2013.01); C08F 273/00 (2013.01); C08G 63/688 (2013.01); C08J 7/18 (2013.01)

(58) Field of Classification Search
CPC .......... C08F 273/00; C08J 7/18; C08L 89/00; C08H 1/06
USPC .......................................................... 526/222
See application file for complete search history.

(56) References Cited

U.S. PATENT DOCUMENTS

| | | | |
|---|---|---|---|
| 3,642,498 A | | 2/1972 | Anker |
| 5,207,941 A | * | 5/1993 | Kroner et al. ................. 510/337 |
| 5,654,368 A | | 8/1997 | Nakano et al. |
| 6,884,842 B2 | | 4/2005 | Soane et al. |
| 6,916,909 B1 | | 7/2005 | Nicolas et al. |
| 7,066,995 B1 | | 6/2006 | Barone et al. |
| 7,671,258 B2 | | 3/2010 | Zhang et al. |
| 2003/0119089 A1 | | 6/2003 | Van Dyke |
| 2010/0069612 A1 | | 3/2010 | Umeda et al. |
| 2010/0144902 A1 | | 6/2010 | Shu |

FOREIGN PATENT DOCUMENTS

| | | |
|---|---|---|
| JP | 54-137064 | 10/1979 |
| JP | 05-285374 | 11/1993 |
| JP | 06-336499 | 12/1994 |

OTHER PUBLICATIONS

Jin et al., "Graft polymerization of native chicken feathers for thermoplastic applications," Journal of Agricultural and Food Chemistry, 2011, vol. 59, pp. 1729-1738.
International Search Report for PCT/US2012/053483, dated Jan. 29, 2013, two pages total.
Written Opinion of the International Searching Authority for PCT/US2012/053483, dated Jan. 29, 2013, four pages total.
International Search Report for PCT/US2012/053475, dated Jan. 29, 2013, two pages total.
Written Opinion of the International Searching Authority for PCT/US2012/053475, dated Jan. 29, 2013, four pages total.

* cited by examiner

*Primary Examiner* — Kuo-Liang Peng
(74) *Attorney, Agent, or Firm* — Hamre, Schumann, Mueller & Larson, P.C.

(57) ABSTRACT

The embodiments provided herein are directed to methods and systems for generating a customized functionalized substrate. In particular, the embodiments provided herein generate a customized functionalized substrate that can be used for a variety of applications and a variety of chemical and other reactions, processes and methodologies, by modifying a disulfide bond-containing feedstock through the introduction of a disulfide bond breaking material.

15 Claims, 4 Drawing Sheets

US 9,074,056 B2

METHODS AND SYSTEMS TO PREPARE FUNCTIONALIZED SUBSTRATE FROM DISULFIDE BOND-CONTAINING MATERIAL

PRIORITY DATA

This application claims the benefit of U.S. Provisional Patent Application Ser. No. 61/530,016 entitled "METHODS AND SYSTEMS TO PREPARE FUNCTIONALIZED SUBSTRATE FROM DISULFIDE BOND-CONTAINING MATERIAL," filed on Sep. 1, 2011, and U.S. Provisional Patent Application Ser. No. 61/530,012 entitled "METHODS AND SYSTEMS OF GRAFT POLYMERIZATION ON A FUNCTIONALIZED SUBSTRATE," filed on Sep. 1, 2011, both of which are incorporated by reference in its entirety.

FIELD

This disclosure described herein relates generally to methods and systems to generate a customized functionalized substrate by modifying a disulfide bond-containing material in preparation for desired chemical and other reactions, processes and methodologies.

BACKGROUND

Petroleum is a commodity that is becoming more expensive, impacting the cost of plastic materials and ultimately end-products. Also, petroleum is a non-sustainable material and is subject to geopolitical and environmental forces that further impact cost and future availability. Therefore, an alternative source of chemical feedstock for the production of polymers and for other chemical reactions is desirable, one that is not subject to geopolitical and environmental influences.

Feathers may provide such an alternative. Poultry feathers are composed of approximately 90% keratin and are a plentiful and readily-available byproduct in the food processing industry, with most of the material being disposed of as waste. However, previous documented efforts using chicken feathers as a chemical feedstock have either used solvents or harsh chemicals or have been limited for the purpose of extracting the keratin as an end product.

Once prepared, a functional substrate can be used for a variety of applications. Documented efforts for generation and use of hydrocarbon based nanostructures, films and other building blocks include: generation of short polypeptides that can self-assemble used for nano delivery systems of drugs and compounds across host membranes, filtration systems, and pharmaceutical compositions (U.S. Pat. No. 7,671,258 "Surfactant peptide nanostructures, and uses thereof"); and synthesis of Synthetic Polymer Complements having surface that include functional groups that are complementary to surface sites of targets such as nanostructures or macromolecular targets and capable of interacting with such targets (U.S. Pat. No. 6,884,842 "Molecular compounds having complementary surfaces to targets").

SUMMARY

The embodiments provided herein are directed to methods and systems for generating a customized functionalized substrate. In particular, the embodiments provided herein generate a customized functionalized substrate that can be used for a variety of applications and a variety of chemical and other reactions, processes and methodologies, by modifying a disulfide bond-containing feedstock through the introduction of a disulfide bond breaking material.

three

In one embodiment, a process of preparing a functionalized substrate, is provided. The process includes introducing a disulfide-bond-containing material to a polyfunctional monomer. The disulfide-bond-containing material includes a disulfide bond connecting a first portion and a second portion. The polyfunctional monomer includes at least one first functional group and at least one second functional group. The first functional group includes a disulfide bond breaking material for breaking the disulfide bond. The process further includes performing a solids reaction without the use of water, aqueous solvents or non-aqueous solvents. Performing the solids reaction includes breaking, via the disulfide bond breaking material of the first functional group, the disulfide bond, and forming a second bond between the first portion and the polyfunctional monomer to form the functionalized substrate.

In some embodiments, the second functional group is a reactive site on the functionalized substrate adapted to facilitate a chemical reaction.

In some embodiments, the second functional group includes at least one ring, and the ring is adapted to be opened to form at least a third functional group.

In some embodiments, a feedstock can be customized to provide an alternative to petroleum as a chemical feedstock for the production of polymers. Additionally, the feedstock can be customized for other chemical reactions and processes as by example providing hydrocarbon building block(s) for nanochemistry. Alternatively, the embodiments presented herein are applicable to reclaiming and or reducing waste materials that may otherwise have negative environmental impact.

In some embodiments, poultry feathers and other keratin based materials can be utilized as a sustainable chemical feedstock for the synthesis and generation of functionalized substrate(s) through the systems and processes described herein. These functionalized substrate(s) may be used, for example, for the production of polymers as well as the production of hydrocarbon and other building blocks for nanochemistry. These functionalized substrate(s) can replace many of the petroleum-based feedstocks at a fraction of the cost and remove a waste material from the environment. For example, keratin is biodegradable, and by judicious choice of the monomers, the end-product can be biodegradable, an attribute increasingly sought after in the industry.

The embodiments described herein are targeted towards synthesis of a customizable functionalized substrate in preparation for other chemical reactions. The polyfunctional monomer(s) (and their functional groups) chosen for the synthesis are dependent upon the chemical reactions sought to be achieved. In some embodiments, a polyfunctional monomer(s) containing at least one functional group that is a disulfide bond breaking material (e.g., a thiol (—SH) group) is used to break the disulfide bonds, not for the purposes of extracting keratin, but to specifically to prepare the keratin or other disulfide bond-containing material as a functionalized substrate for further chemical reactions. Applications may include the production of plastics, coatings, adhesives, foam insulation and other polymers, as well as applications in other chemistry disciplines.

Alternatively the functionalized substrate can be customized to provide reactive site chemoselectivity. This may, but need not, occur through the introduction of "protective" functional groups (or materials including protective functional groups) that attach to and prevent the functional groups of the functionalized substrate from reacting other than as desired. This chemoselectivity is desirable for solid phase synthesis and certain nanochemistry applications. The functionalized substrate can also be customized to provide, through reduction or other chemical reactions, a source of peptides and protein chains for solid phase synthesis, nanochemistry and other applications.

In some embodiments, disulfide bond-containing feedstock(s) are used, which are then synthesized into a customized functionalized substrate through the introduction of selected disulfide bond breaking materials.

In some embodiments, the processes and systems described herein generate customized functionalized substrates in preparation for further chemical reactions by modifying a disulfide bond-containing feedstock through the introduction of a disulfide bond breaking material (e.g. a thiol (—SH) in a thiol-disulfide exchange) chosen to achieve the desired result. In particular, the described process and system provide a method to functionalize a substrate containing for example, protein, peptides or other materials containing disulfide bonds through the introduction of one or more polyfunctional monomers. The polyfunctional monomer(s) includes at least two functional groups of which one functional group is a disulfide bond breaking material (e.g., a thiol (—SH) group). The disulfide bond-breaking material is used to break the disulfide (S—S) bonds between cysteine residues that crosslink the feedstock and to reform a disulfide bond between one of the cysteine residues and the attacking thiol or other disulfide bond breaking material. The chain length, reactive site, crosslinking and other characteristics of the functionalized substrate and its constituents may be customized by the polyfunctional monomer(s) ($M^1$), and their functional groups, chosen for the functionalization.

The embodiments provided herein can use protein, peptides, and any material containing disulfide bonds. It is understood that while the embodiments described below describe the use of protein keratin, other materials that contain disulfide bonds such as vulcanized rubber (tires) may be used as the chemical feedstock for production of the functionalized substrate. Keratin is a sustainable chemical feedstock that can be found in avian feathers, hair, wool and other sources.

Cysteine residue

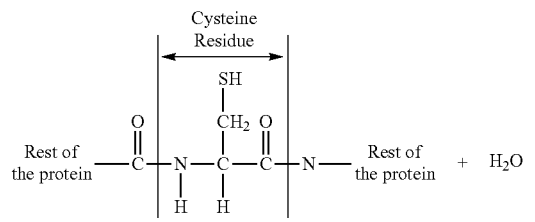

(illustrated above between the vertical dashed lines), is the fragment of the cysteine amino acid after it has been incorporated into the protein, however missing the $H_2O$. In proteins, two thiol groups from two cysteine residues may form a sulfur-sulfur bond (a disulfide bond) crosslinking the protein. The existing disulfide bond is broken by introducing a disulfide bond breaking material (e.g., one containing a thiol (—SH) group), and a new disulfide bond is formed between one of the cysteine residues and the attacking thiol or other disulfide bond breaking material. The other cysteine residue is converted to a thiol. In other embodiments, the other cysteine residue can be converted to other chemical compositions. In one embodiment, a protein, peptide or other material containing disulfide bonds is mixed with polyfunctional monomer(s) ($M^1$) with the generic structure

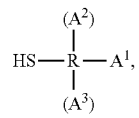

where HS is a thiol group, R is a generic hydrocarbon, $A^1$ is another functional group, and $A^2$ and $A^3$ are optional functional groups. The polyfunctional monomer(s) is not limited to having three functional groups in addition to the disulfide bond breaking functional group, but may have any number of additional functional groups ($A^n$). These functional groups that make up $A^1$, $A^2$, $A^3$, through $A^n$ can be taken from the standard lists of organic functional groups and include acid anhydrides, acyl halides, alcohols, aldehydes, alkenes, alkynes, amines, carboxylic acids, esters and thiols, as well as additional functional groups known in the arts. $A^1$, $A^2$ and $A^3$ do not have to be the same functional group. The thiol groups in the polyfunctional monomer $M^1$ break the disulfide bonds as described above and reform as new disulfide bonds with the polyfunctional monomer $M^1$. The unreacted functional groups, for example, $A^1$, $A^2$ through $A^n$, become the reactive sites of the functionalized substrate for the further chemical reactions for which the functionalized substrate was produced. The functional groups are chosen dependent upon the material to be produced or the chemical or other reactions and processes to be performed on or with the substrate. Additionally multiple and different $M^1$(s) can be utilized as desired. By example only the following is a partial list of $M^1$ polyfunctional monomers containing a disulfide bond breaking thiol group:

| Examples of Polyfunctional Monomers with at least 1 Thiol, M1 |
|---|
| Ethanedithiol |
| Propanedithiol |
| Butanedithiol |
| Pentanedithiol |
| Hexanedithiol |
| Propanetrithiol |
| Butanetrithiol |
| Pentanetrithiol |
| Hexanetrithiol |
| Butanetetrathiol |
| Pentanetetrathiol |
| Hexanetetrathiol |
| Hydroxy-ethanedithiol |
| Hydroxy-propanedithiol |
| Hydroxy-butanedithiol |
| Hydroxy-pentanedithiol |
| Hydroxy-hexanedithiol |
| Dihydroxy-ethanethiol |
| Dihydroxy-propanethiol |
| Dihydroxy-butanethiol |
| Dihydroxy-pentanethiol |
| Dihydroxy-hexanethiol |
| Hydroxy-pentanetrithiol |
| Hydroxy-hexanetrithiol |
| Dihydroxy-pentanedithiol |
| Dihydroxy-hexanedithiol |
| Trihydroxy-pentanethiol |
| Trihydroxy-hexanethiol |
| Hydroxy-pentanetetrathiol |
| Hydroxy-hexanetetrathiol |
| Dihydroxy-pentanetrithiol |
| Dihydroxy-hexanetrithiol |
| Trihydroxy-pentanedithiol |
| Trihydroxy-hexanedithiol |

-continued

Examples of Polyfunctional Monomers with at least 1 Thiol, M1

Tetrahydroxy-pentanethiol
Tetrahydroxy-hexanethiol
Mercaptoethyl ether
Mercaptopropyl ether
Mercaptobutyl ether
Mercaptopentyl ether
Mercaptoacetic acid
Mercaptopropionic acid
Mercaptobutyric acid
Mercaptovaleric acid
2,2'-(Ethylenedioxy)diethanethiol
3-Mercaptopropyl methyldimethoxysilane
2-Mercaptopropyltrimethoxysilane
Trimethylolpropane tris(2-mercaptoacetate)
Trimethylolpropane tris(2-mercaptopropionate)
Pentaerythritol tetrakis(2-mercaptoacetate)
Pentaerythritol tetrakis(2-mercaptopropionate)

In one embodiment, disulfide bond-containing feedstock may be utilized for the preparation of a functionalized substrate.

In one embodiment, various waste materials may be utilized as a feedstock for the preparation of the functionalized substrate.

In one embodiment, the process may be used to prepare a waste material for biodegradation or recycling, or to otherwise address environmental impact concerns.

In one embodiment the process incorporates a method to functionalize a disulfide bond-containing feedstock through the addition of polyfunctional monomer(s) $M^1$, having two or more functional groups of which at least one functional group is a thiol or other disulfide bond breaking material to break and reform the disulfide bond (S—S) in preparation for other chemical reactions. The disulfide bond containing feedstock is customizable by the choice of the monomers and functional groups utilized in preparation of the customized functionalized substrate, such customization including but not limited to the chain length, reactive site chemoselectivity, physical characteristics (hormone attachment site), crosslinking, etc.

In one embodiment, the process may be a solids reaction to prepare the functionalized substrate from a disulfide bond-containing feedstock, without the use of water, aqueous solvents or non-aqueous solvents.

In one embodiment, the process may utilize water or aqueous solvents to prepare the functionalized substrate from a disulfide bond-containing feedstock.

In one embodiment, the process may utilize non-aqueous solvents to prepare the functionalized substrate from a disulfide bond-containing feedstock.

In one embodiment, the process may utilize solid phase synthesis to further modify the functionalized substrate, for example to aid in the recovery of the products synthesized, such as peptides.

In one embodiment, combinatorial chemistry may be applied for the rapid synthesis of a large number of different but structurally related molecules or materials.

In another embodiment, disulfide bond-containing feedstock comprising or containing biodegradable materials such as keratin may be utilized to prepare biodegradable materials.

In one embodiment, the disulfide bond-containing feedstock may be vulcanized rubber wherein the disulfide bonds in the feedstock are broken for recovery of the rubber or other constituents, for recycling or biodegradation, or for the purpose of further synthesis or processing the feedstock for use as a functionalized substrate.

In one embodiment, the functionalized substrate may be used for graft polymerization. In the case of graft polymerization, the other functional group(s) of the monomer(s) $M^1$ that may be added is dependent upon the type of polymer to be produced. The other functional group(s) includes but are not limited to acid anhydrides, acyl halides, alcohols, aldehydes, alkenes, alkynes, amines, carboxylic acids, esters and thiols. Furthermore, additional monomers $M^2$ may be added to the aforementioned protein, peptides or other materials including disulfide bonds before, with, or after the addition of the polyfunctional monomer containing at least one thiol group.

In one embodiment, the functionalized substrate may be used for macromer grafting of prebuilt or existing polymer(s) or other materials. In the case of graft reactions, one or more prebuilt polymers may be reaction grafted to the functionalized substrate, for example, the esterification reaction between an hydroxyl (—OH) terminated polymer and a carboxylic acid (—COOH) group of the functionalized substrate.

In one embodiment, the functionalized substrate may be customized for nanochemistry applications, such as for use as a building block(s) for nanostructures.

In one embodiment, the functionalized substrate may be customized for biological or biochemical applications, for example by reacting with, binding with, interlocking or modifying hormones, antibodies or cell walls.

In one embodiment, the functionalized substrate may be customized for supramolecular chemistry applications, for example reacting with "bucky balls" or carbon nanotubes.

In one embodiment, the functionalized substrate may be customized for other chemistry disciplines and intra/interdisciplinary chemistries as required for a specific outcome, for example by creating chemoselective sites that are specific to an inorganic atom(s) or molecule(s), or for colorimetric analyses or outcomes.

In one embodiment the functionalized substrate may be customized to provide specific electrochemical, photochemical, thermochemical, physical and optical properties, individually or together.

In one embodiment, the process incorporates more than one customized functionalized substrate that may be chained, cross-linked, combined etc.

In one embodiment the functionalized substrate may be prepared for the purpose of reduction or further processing of the substrate, for example to synthesize individual peptide or other chains or molecules for use in nanochemistry, medical, biochemical or other applications.

DETAILED DESCRIPTION

Figure 1A:
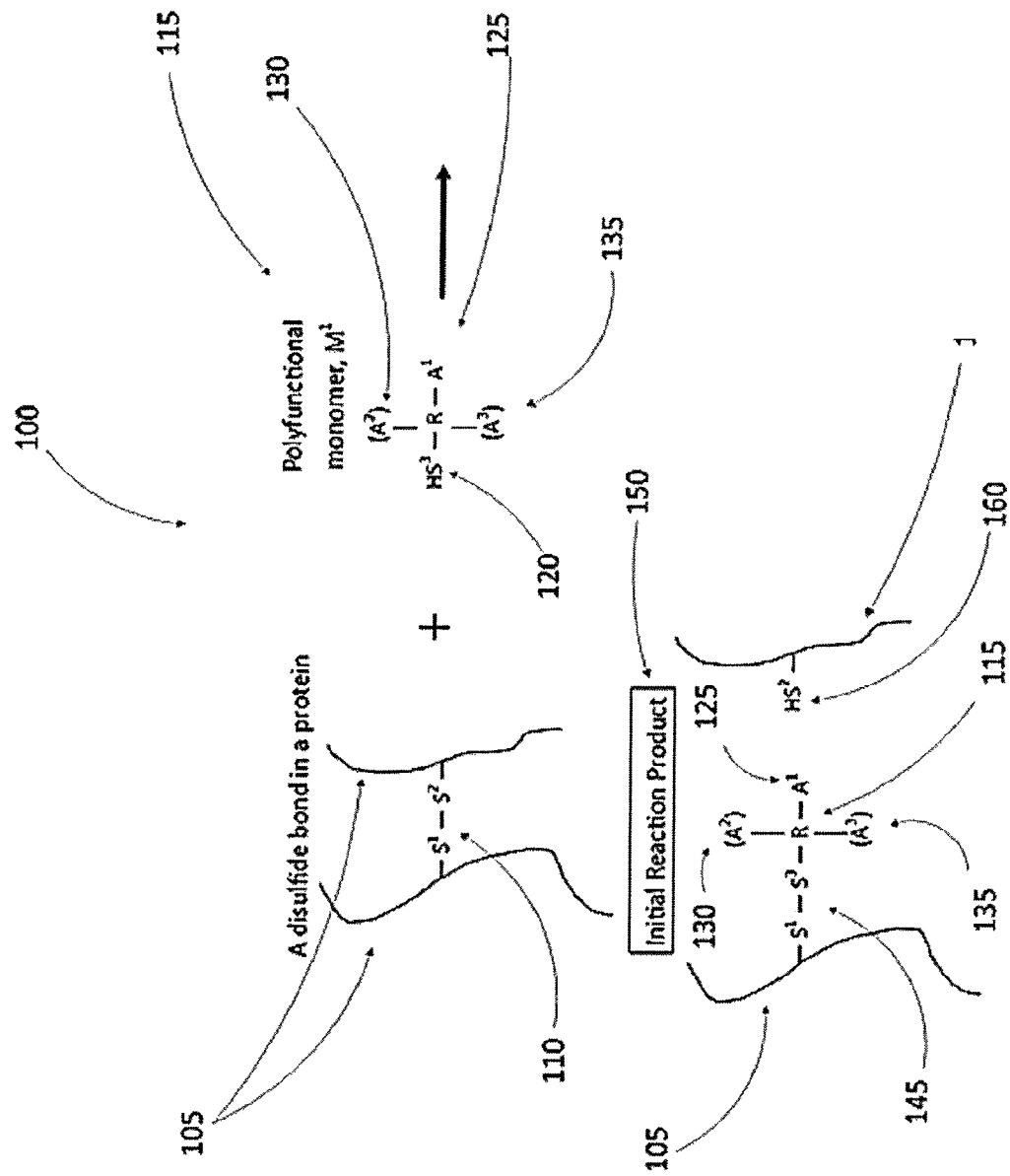
FIG. 1a is an illustration of one embodiment of the functionalization of a disulfide bond-containing feedstock through the introduction of a polyfunctional monomer.

In the following detailed description, reference is made to the accompanying drawings, which form a part hereof, and in which are shown, by way of illustration, specific embodiments in which the inventive concepts may be practiced. These embodiments are described in sufficient detail to enable those skilled in the art to practice the described method or process, and it is to be understood that the embodiments may be combined or used separately, or that other embodiments may be utilized, and that design, implementation, and procedural changes may be made without departing from the spirit and scope of the inventive concepts. The following detailed description provides examples.

The term "chemical reactions" is defined as reactions, processes and methodologies including, but not limited to, chemical, biochemical, biological, electrochemical, optico-chemical, physical or other reactions, processes and methodologies.

The term "feedstock" and "disulfide bond-containing feedstock" may be used interchangeably and is defined as material comprising or containing proteins, peptides, or other disulfide bond containing materials. Such feedstock may be waste stream materials, for example avian feathers, hair, or wool.

The term "functionalized substrate" is defined as a material which has been modified through a thiol-disulfide exchange in preparation for other chemical reactions.

The term "thiol-disulfide exchange" is defined as the reaction occurring between a thiol functional group and a disulfide group. The sulfur atom of the thiol attacks one of the sulfur atoms in the disulfide bond forming a new bond between the attacking sulfur atom and the attacked sulfur atom. Simultaneously, the previously existing disulfide bond is broken and the remaining sulfur atom leavings and reforms as a thiol group.

The term "supramolecular chemistry" refers to the chemistry and collective behavior of organized ensembles of molecules. In this mesoscale regime, molecular building blocks are organized into longer-range order and higher-order functional structures via comparatively weak forces."

The term "nanochemistry" is defined as the science of tools, technologies, and methodologies for chemical synthesis, analysis, and biochemical diagnostics, performed in at least nano liter to femtoliter domains. It is the use of synthetic chemistry to make nano scale building blocks of desired shape, size, composition and surface structure, charge and functionality with an optional target to control self-assembly of these building blocks at various scale-lengths.

The term "combinatorial chemistry" is defined as the rapid synthesis of a large number of different but structurally related molecules or materials.

The term "chemoselectivity" is defined as the preferential outcome of one instance of a generalized reaction over a set of other plausible reactions.

The term "graft polymerization" is defined as a reaction occurring on a functionalized substrate wherein the polymerization occurs at the functionalization site(s). Note that this definition does not assume or require a particular sequence or timing of events, unless specifically stated.

The term "solid-phase synthesis" is a method in which molecules are bound on a surface and synthesized step-by-step in a reactant solution; compared with normal synthesis in a liquid state, it is easier to remove excess reactant or byproduct from the product.

The term "macromer" is defined as a polymer with the defined reactive functions at both ends and/or on the chain, which can constitute a building bloc of the final polymers of certain values via suitable chain-extending reactions.

The term "graft reaction" and "macromer grafting" may be used interchangeably defined as the grafting of a macromer by reaction between a macromer and another chemosensitive site of a polymer or a macromer to another macromer for chain extension.

The term "cysteine residue" is defined as what is left of a cysteine molecule after the cysteine molecule is incorporated within a protein, peptide or other material containing disulfide bonds.

The term "functional group" is defined as a group of atoms found within molecules that are involved in the chemical reactions characteristic of those molecules such as but not limited to acid anhydrides, acyl halides, alcohols, aldehydes, alkenes, alkynes, amines, carboxylic acids, esters and thiols.

The letter "$M^1$" is representative of a polyfunctional monomer containing at least one thiol group and one or more functional groups $A^1, A^2, A^3, \ldots$ and $A^n$ (n is an integer larger than one).

The letter "$M^2$" is representative of a monomer wherein $M^{2-1}$ and $M^{2-2} \ldots$ and $M^{2-n}$ refer to different monomers utilized in a polymerization process (n is an integer larger than one).

The letter "S" is representative of a sulfur atom.

The letters "$A^1, A^2, A^3$, and $A'''$" are representative of functional groups that may or may not be the same.

The letter "R" is representative of a generic hydrocarbon or hydrocarbon chain that may be an alkyl, aromatic, linear, branched or any combination thereof.

Note that in the following illustrations, superscripts do not denote the number of atoms or functional groups involved (for example $S^1$ or $A^1$), but are simply used to differentiate between atoms or functional groups for purposes of clarity.

Figure 1B:
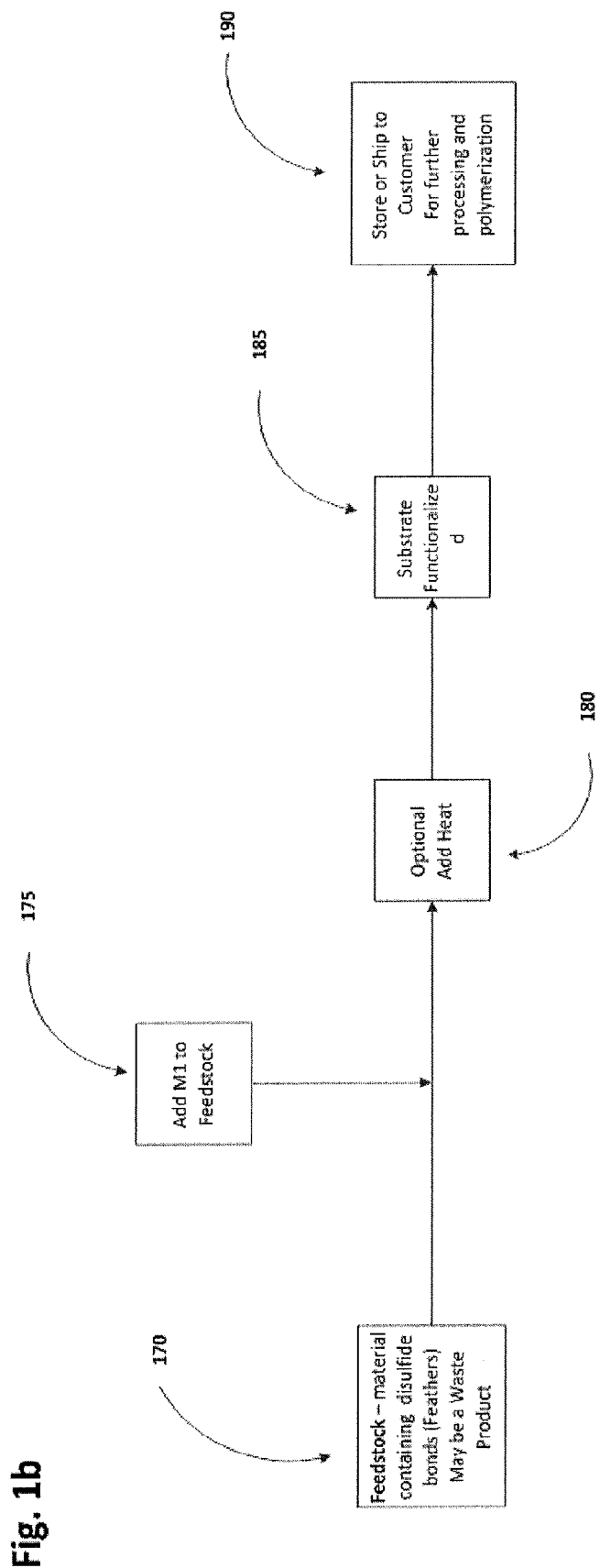
FIG. 1b is an illustration of one embodiment of the process flow of the functionalization of a disulfide bond-containing feedstock through the introduction of a polyfunctional monomer.

FIG. 1a and FIG. 1b illustrate an overview and process flow of an exemplary functionalization of a disulfide bond-containing feedstock 100 prior to graft polymerization on a functionalized substrate wherein a polyfunctional monomer 115, 175 is added to the feedstock 105, 170 to break the disulfide bond 110 and reform a disulfide bond 145 between the cysteine residues and the attacking thiol groups.

FIG. 1a is an illustration of one embodiment of the functionalization of a disulfide bond-containing feedstock through the introduction of a polyfunctional monomer, of which at least one functional group must be a thiol or other disulfide bond breaking material, to break the disulfide bonds between the cysteine residues crosslinking the protein and reform new disulfide bonds between the cysteine residues of the feedstock and the attacking thiol or other disulfide bond breaking group.

FIG. 1b is an illustration of one embodiment of the process flow of the functionalization of a disulfide bond-containing feedstock through the introduction of a polyfunctional monomer, of which at least one functional group must be a thiol or other disulfide bond breaking material, to break the disulfide bonds between the cysteine residues crosslinking the protein and reform new disulfide bonds between the cysteine residues of the feedstock and the attacking thiol or other disulfide bond breaking group.

Disulfide bonds 110 are the bonds between two cysteine residues that are part of and sometimes crosslink proteins, peptides or other materials 105 containing the disulfide bonds 110. At least one polyfunctional monomer $M^1$ 115 including at least one thiol or other disulfide bond breaking group 120 and one $A^1$ functional group 125 and optionally one $A^2$ functional group 130 or two functional groups $A^2$ 130 and $A^3$ 135 respectively may be added. In accordance with FIG. 1b, process and decision flow, the feedstock has been functionalized 185 and is stable and the functionalized substrate may be shipped 190 to a customer for further processing. Functional groups $A^1, A^2$, and $A^3$ may be any functional group of choice dependent upon the target polymer. Furthermore, multiple and different polyfunctional monomers $M^1$ 115 may be added as required dependent upon the polymer to be produced. Note that this illustration of process and decision flow does not assume or require a particular sequence or timing of events, unless specifically stated.

Upon adding the polyfunctional monomer(s) $M^1$ 115 to the segment 105 of the protein, peptide or other material containing the disulfide bonds 110, the initial reaction is the breaking of the disulfide bond 110 by the thiol 120 and reformation of disulfide bond 145 on the segment 105 and formation of a thiol 160 on the segment 165.

Figure 2:
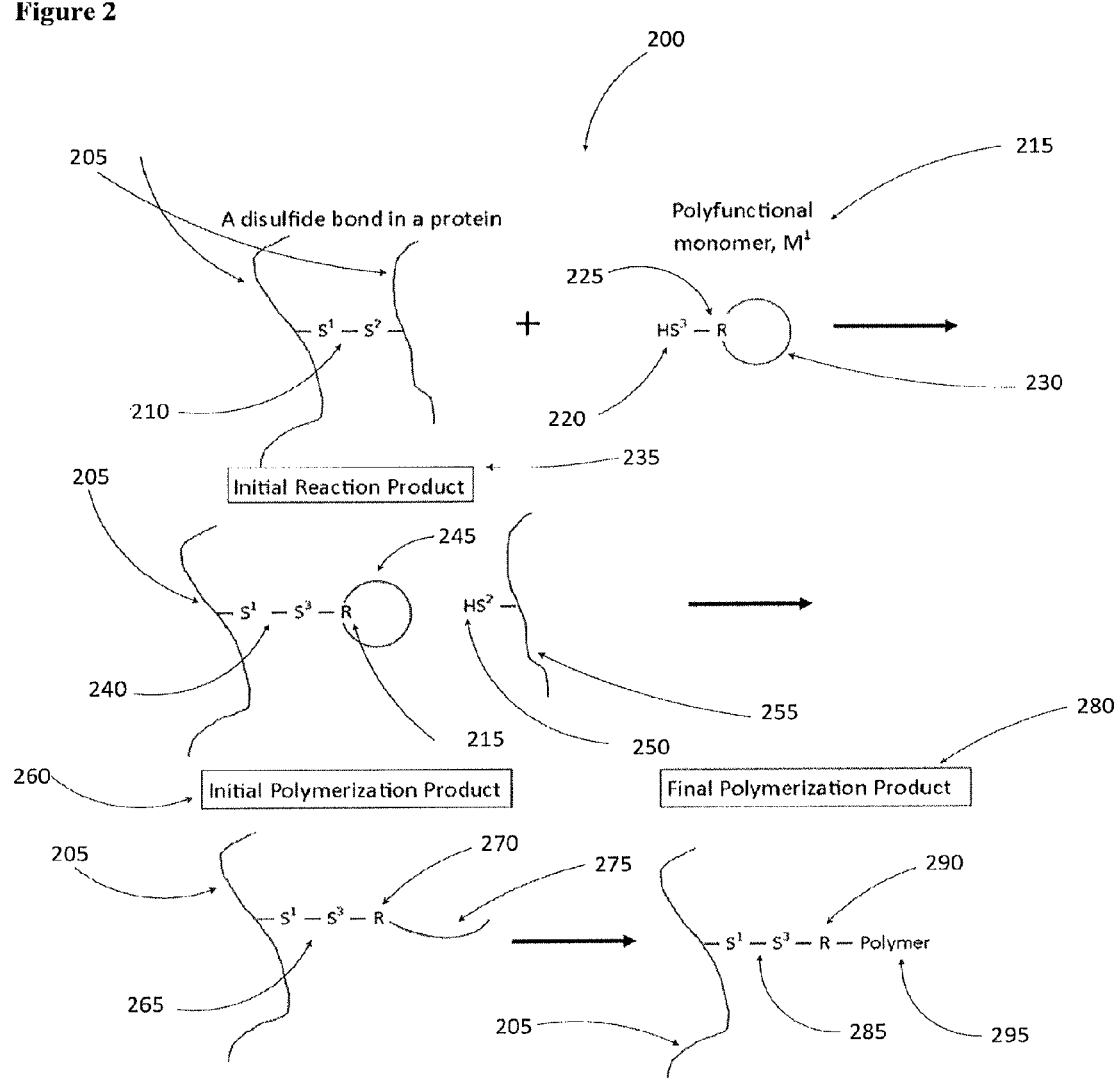
FIG. 2 is an illustration of one embodiment of the graft polymerization on a functionalized substrate, and its polymerization without the addition of $M^2$ monomer.

FIG. 2 illustrates an example of graft polymerization 200 on a functionalized substrate. Disulfide bonds 210 are the bonds between two cysteine residues that are part of proteins, peptides or other materials 205 containing disulfide bonds. At least one polyfunctional monomer $M^1$ 215 including at least one thiol group 220 and a ring 230 capable of polymerizing upon opening may be added.

Upon adding polyfunctional monomer(s) $M^1$ 215 to the segment 205 of the protein, peptide or other material containing disulfide bonds, the initial reaction is the breaking of the disulfide bond 210 by the thiol 220 and reformation of the disulfide bond 240 on the segment 205 and formation of thiol 250 on the segment 255.

After the disulfide bond reformation has occurred, appropriate conditions are established to open the ring 230 on the monomer. The opened ring 275 is then capable of reacting with other rings on monomers 215, leading to formation of the grafted polymer 295. Polymerization can be initiated by appropriate means using, for example, heat, UV light, catalyst, etc.

As one example, the monomer $M^1$ 215 may contain a lactide ring. Upon addition of heat or an appropriate catalyst such as tin (II) chloride, the lactide ring opens and graft polymerization occurs.

In some embodiments, the monomer $M^1$ 215 includes a second functional group that is a ring bearing functional group that includes a lactone, a lactide, a lactam, and/or a cyclic ether.

In some embodiments, polymerization can be self-initiated, via a second monomer that is introduced to a disulfide-bond-containing material and a polyfunctional monomer.

Figure 3:
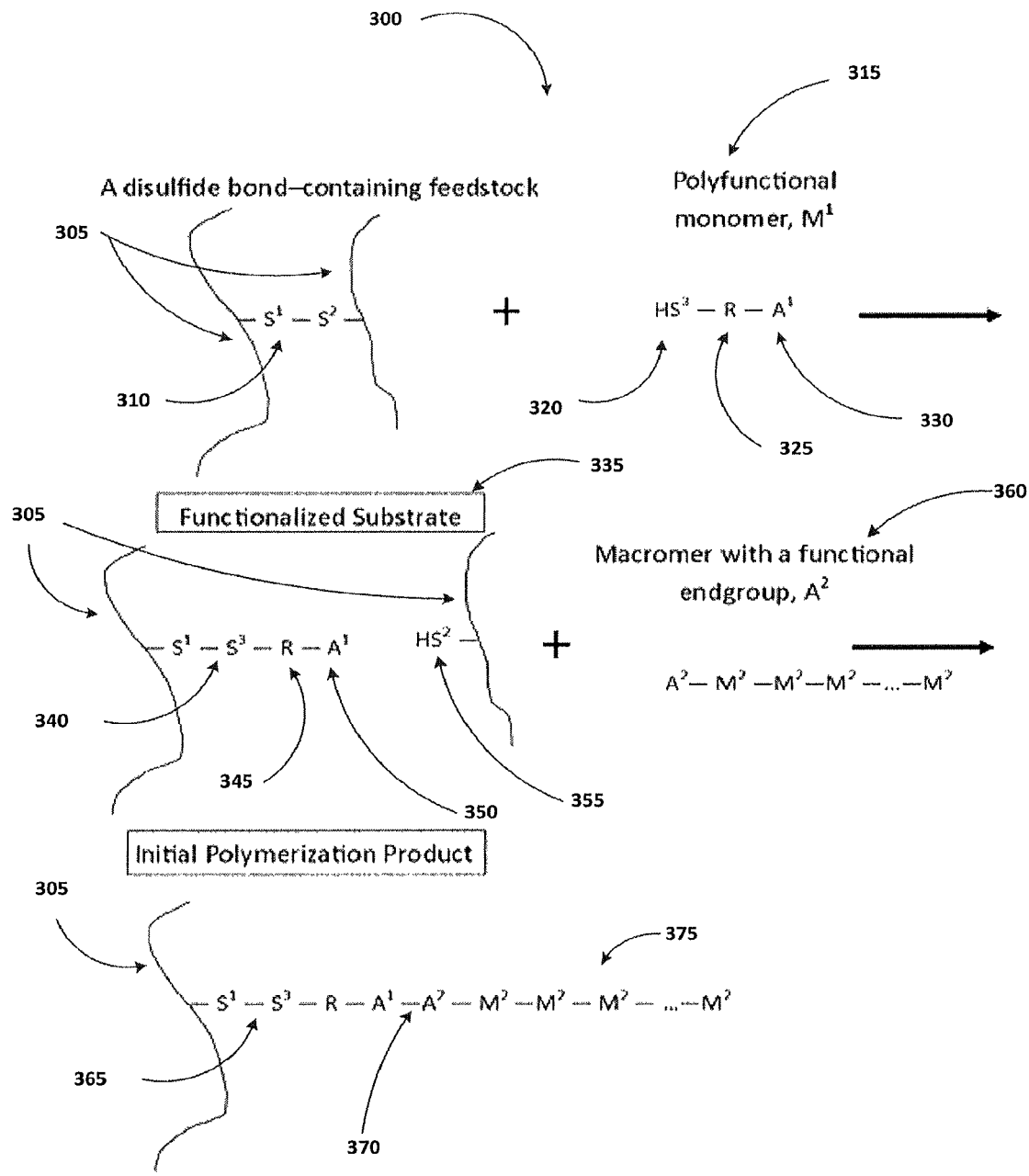
FIG. 3 is an illustration of one embodiment of the overview of a graft reaction or macromer grafting on a functionalized substrate made from a feedstock containing or comprising protein, peptides or other materials containing disulfide bonds.

FIG. 3 illustrates an overview of an exemplary macromer grafting polymerization 300 on a substrate containing protein, peptides or other materials containing disulfide bonds. Disulfide bonds 310 are the bonds between two cysteine residues that are part of proteins, peptides or other materials 305 containing the disulfide bonds 310. A polyfunctional monomer 315, containing at least one thiol —$HS^3$ 320, and at least another functional group $A^1$ 330 is added to the feedstock 305 to break the disulfide bond 310 and reform a disulfide bond 340 between the cysteine residues and the attacking thiol groups. Following the functionalization of the substrate 305, a macromer molecule 360 containing at least one reactive endgroup $A^2$ is added to the mixture and the grafting reaction between the functional groups $A^1$ and $A^2$ occurs resulting in a new bond 370. An example of this would the reaction between a hydroxyl (—OH) terminated polymer and a carboxylic acid (—COOH) group of the functionalized substrate.

ASPECTS

1. A process of preparing a functionalized substrate, comprising:
   introducing a disulfide-bond-containing material to a polyfunctional monomer, the disulfide-bond-containing material including a disulfide bond connecting a first portion and a second portion, the polyfunctional monomer including at least one first functional group and at least one second functional group, the first functional group including a disulfide bond breaking material for breaking the disulfide bond; and
   performing a solids reaction without the use of water, aqueous solvents or non-aqueous solvents, wherein performing the solids reaction includes:
   breaking, via the disulfide bond breaking material of the first functional group, the disulfide bond; and
   forming a second bond between the first portion and the polyfunctional monomer to form the functionalized substrate.
2. The process of aspect 1, wherein the second functional group is a reactive site on the functionalized substrate adapted to facilitate a chemical reaction.
3. The process of aspects 1-2, wherein the disulfide-bond-containing material is a feedstock that includes a protein, an avian feather, a hair, a wool keratin, or a vulcanized rubber.
4. The process of aspects 1-3, wherein the disulfide bond breaking material includes a thiol group, and the second bond is a disulfide bond.
5. The process of aspects 1-4, wherein the second functional group includes at least one of an acid anhydride, an acyl halide, an alcohol, an aldehyde, an alkene, an alkyne, an amine, a carboxylic acid, an ester and/or a thiol.
6. The process of aspects 1-5, wherein the second functional group includes at least one ring, the ring being adapted to be opened to form at least a third functional group.
7. The process of aspects 1-6, wherein the second functional group is a ring bearing functional group that includes a lactone, a lactide, a lactam, and/or a cyclic ether.
8. The process of aspects 1-7, wherein the polyfunctional monomer includes trimethylolpropane tris(2-mercaptoacetate), trimethylolpropane tris(2-mercaptopropionate), pentaerythritol tetrakis(2-mercaptoacetate), or pentaerythritol tetrakis(2-mercaptopropionate).
9. The process of aspects 1-8, wherein the polyfunctional monomer includes three or more second functional groups.
10. The process of aspects 1-9, wherein the first and second portions connected by the disulfide bond are cysteine residues.
11. A polymerization process, comprising:
    providing a functionalized substrate according to aspect 1, and
    initiating a polymerization reaction on the functionalized substrate.
12. The process of aspect 11, further comprising:
    adding one or more monomers to react with the at least one second functional group.
13. The process of aspects 11-12, further comprising initiating the polymerization reaction using an initiator that includes at least one of a UV light, a thermal initiator, and/or a catalyst.
14. The process of aspects 11-13, further comprising introducing a second monomer to the disulfide-bond-containing material and the polyfunctional monomer, and
    self-initiating, via the second monomer, the polymerization reaction.
15. The process of aspects 11-14, wherein the second monomer is a macromer.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A process of preparing a functionalized substrate, comprising:
    introducing a disulfide-bond-containing material to a polyfunctional monomer, the disulfide-bond-containing material including a disulfide bond connecting a first portion and a second portion, the polyfunctional monomer including at least one first functional group and at least one second functional group, the first functional group including a disulfide bond breaking material for breaking the disulfide bond; and
    performing a solids reaction without the use of water, aqueous solvents or non-aqueous solvents, wherein performing the solids reaction includes:
        breaking, via the disulfide bond breaking material of the first functional group, the disulfide bond; and
        forming a second bond between the first portion and the polyfunctional monomer to form the functionalized substrate.

2. The process of claim 1, wherein the second functional group is a reactive site on the functionalized substrate adapted to facilitate a chemical reaction.

3. The process of claim 1, wherein the disulfide-bond-containing material is a feedstock that includes a protein, an avian feather, a hair, a wool keratin, or a vulcanized rubber.

4. The process of claim 1, wherein the disulfide bond breaking material includes a thiol group, and the second bond is a disulfide bond.

5. The process of claim 1, wherein the second functional group includes at least one of an acid anhydride, an acyl halide, an alcohol, an aldehyde, an alkene, an alkyne, an amine, a carboxylic acid, an ester and/or a thiol.

6. The process of claim 1, wherein the second functional group includes at least one ring, the ring being adapted to be opened to form at least a third functional group.

7. The process of claim 1, wherein the second functional group is a ring bearing functional group that includes a lactone, a lactide, a lactam, and/or a cyclic ether.

8. The process of claim 1, wherein the polyfunctional monomer includes trimethylolpropane tris(2-mercaptoacetate), trimethylolpropane tris(2-mercaptopropionate), pentaerythritol tetrakis(2-mercaptoacetate), or pentaerythritol tetrakis(2-mercaptopropionate).

9. The process of claim 1, wherein the polyfunctional monomer includes three or more second functional groups.

10. The process of claim 1, wherein the first and second portions connected by the disulfide bond are cysteine residues.

11. A polymerization process, comprising:
    providing a functionalized substrate according to claim 1, and
    initiating a polymerization reaction on the functionalized substrate.

12. The process of claim 11, further comprising:
    adding one or more monomers to react with the at least one second functional group.

13. The process of claim 11, further comprising initiating the polymerization reaction using an initiator that includes at least one of a UV light, a thermal initiator, and/or a catalyst.

14. The process of claim 11, further comprising introducing a second monomer to the disulfide-bond-containing material and the polyfunctional monomer, and
    self-initiating, via the second monomer, the polymerization reaction.

15. The process of claim 11, wherein the second monomer is a macromer.

* * * * *